United States Patent

[11] 3,537,410

| [72] | Inventor | Auram B. Zanft<br>New York, New York |
|---|---|---|
| [21] | Appl. No. | 761,132 |
| [22] | Filed | Sept. 20, 1968 |
| [45] | Patented | Nov. 3, 1970 |
| [73] | Assignee | Hagan Industries Incorporated<br>Carona, New York<br>a corporation of New York |

[54] INCINERATOR WITH RESIDUE REDUCTION
9 Claims, 1 Drawing Fig.

| [52] | U.S. Cl. | 110/8,<br>110/165 |
|---|---|---|
| [51] | Int. Cl. | F23g 5/12 |
| [50] | Field of Search | 110/8, 18,<br>28, 165 |

[56] References Cited
UNITED STATES PATENTS

| 1,452,045 | 4/1923 | Hawley | 110/28 |
| 1,846,647 | 2/1932 | Leitch et al. | 110/28 |
| 1,930,909 | 10/1933 | Preston | 110/165 |
| 2,033,685 | 3/1936 | Coutant | 110/28 |
| 2,667,848 | 2/1954 | Silk | 110/165 |

Primary Examiner—Kenneth W. Sprague
Attorney—Mason, Fenwick and Lawrence

ABSTRACT: An incinerator including a combustion chamber, means for charging refuse into the combustion chamber, means for igniting refuse charged into the combustion chamber, the igniting means being sufficient to incinerate organic refuse in the combustion chamber, a melting chamber, passage means for conducting residue from the combustion chamber to the melting chamber, means for melting residue charged into the melting chamber and the melting means being sufficient to melt inorganic residue received from the combustion chamber.

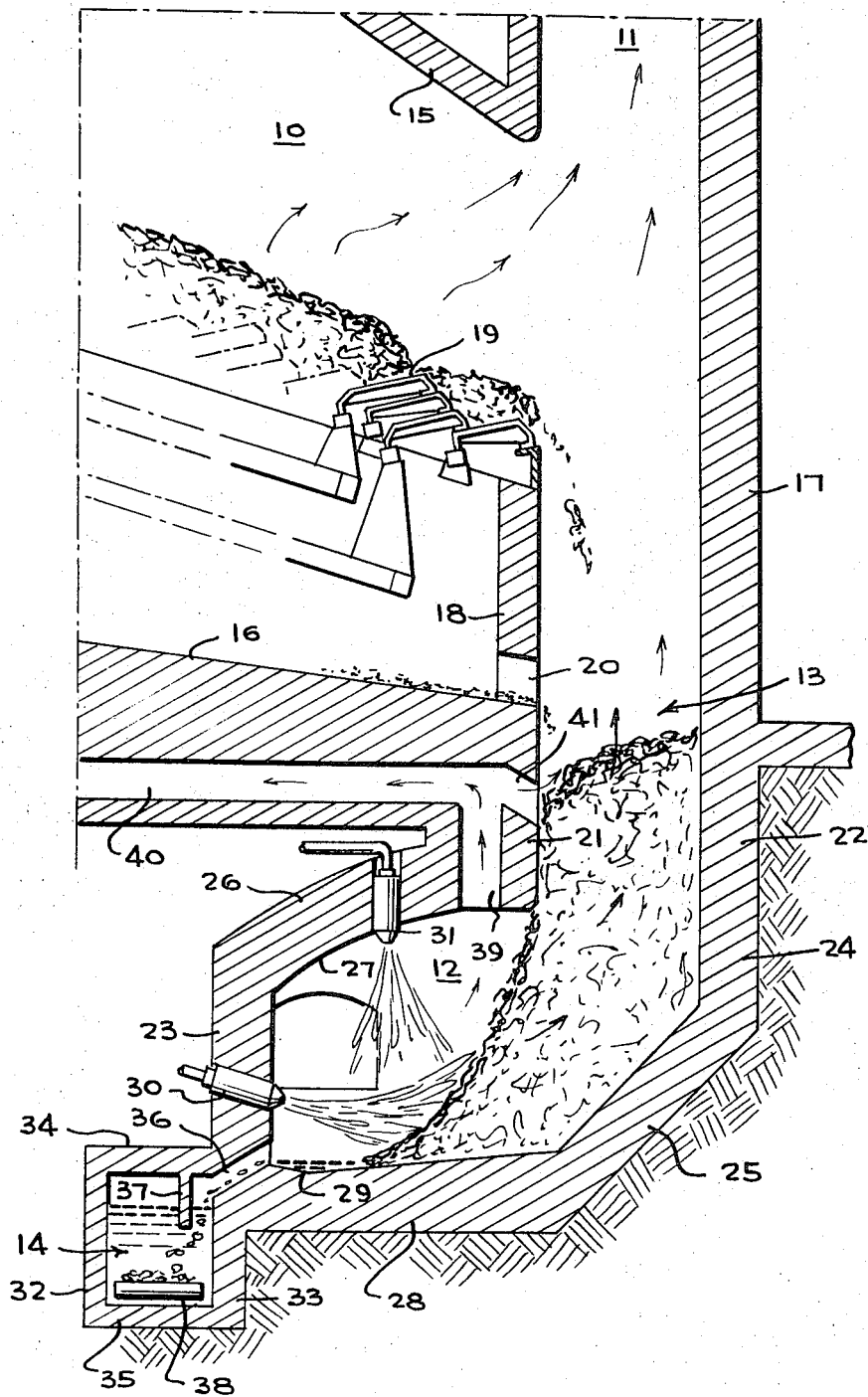

3,537,410

INCINERATOR WITH RESIDUE REDUCTION

This invention relates to an apparatus and method for reducing refuse to a minimum volume and weight.

In conventional large capacity incinerators of the type commonly employed in residential, municipal and industrial installations, a considerable amount of residue is produced which must be removed and deposited elsewhere. Such residue generally has a volume of approximately 20 percent of the original volume and weight of approximately 10 percent of the original weight of the refuse.

Residue from conventional large capacity incinerators usually is transported to a remote site and used for landfill purposes which necessitates the utilization of land and a considerable amount of handling costs in removing the residue from the incinerator site, transporting the residue to the landfill site, and depositing the residue at appropriate locations at the landfill site. The residue recovered from such incinerators largely consists of inorganic and inert materials, but also contains a substantial quantity of organic and putrescible materials, depending on the efficiency of the incinerator. Such materials deposited on landfill sites, often located near urban centers, decompose and thus result in pollution of the air, the water table and water courses in the vicinity of the landfill sites. The presence and decomposition of such materials also results in attracting rodents and insects. These are conditions obviously sought to be eliminated by the present invention.

Accordingly, the principal purpose of the present invention is to provide an improved incinerator.

Another object of the present invention is to provide an improved large capacity incinerator adapted for use in residential, municipal and industrial installations.

A further object of the present invention is to provide an improved incinerator adapted for reducing refuse to a minimum volume and weight.

A still further object of the present invention is to provide an improved incinerator capable of reducing heterogeneous refuse including organic and inorganic materials to a minimum volume and weight.

Another object of the present invention is to provide an improved incinerator for reducing refuse to a minimum volume and weight, utilizing minimum fuel for the reduction of such refuse.

A further object of the present invention is to provide a novel incinerator capable of substantial reduction of all organic and putrescible materials in the residue.

A still further object of the present invention is to provide a novel incinerator which is simple in construction, requires minimum maintenance, and is comparatively inexpensive to manufacture.

Another object of the present invention is to provide a novel method for reducing refuse to a minimum volume and weight.

Other objects and advantages of the present invention will become more apparent to those persons skilled in the art to which the invention pertains, from the following description taken in conjunction with the accompanying drawing which includes a single FIG. consisting of a vertical cross-sectional view of an embodiment of the invention.

Briefly described, the invention generally relates to a large capacity incinerator adapted to reduce heterogeneous refuse to a minimum volume and weight including a combustion chamber, means for charging refuse into the combustion chamber, means for igniting the refuse charged into the combustion chamber, the igniting means being sufficient to incinerate organic refuse in the combustion chamber, a melting chamber, passage means for conducting residue from the chamber to the melting chamber, means for melting residue charged into the melting chamber and the melting means being sufficient to melt the inorganic residue received from the combustion chamber. Preferably, the melting chamber is disposed at a level below the combustion chamber, and the passage means for conducting residue from the combustion chamber to the melting chamber is vertical and restricted in cross section to cause an accumulation of residue in the passage means during operation of the incinerator, thereby sealing the melting chamber from the combustion chamber. In addition, the igniting means is sufficient to produce a temperature in the range of 1,800° to 2,000°F. in the combustion chamber and the melting means is sufficient to produce a temperature in the range of 2,600° to 2,800°F. in the melting chamber.

Referring to the drawing, there is illustrated an embodiment of the invention. The embodiment includes a combustion chamber 10 having a flue 11, a melting chamber 12 disposed at a level below the combustion chamber, a passageway 13 disposed below the flue 11 and intercommunicating the combustion chamber and the melting chamber, and a quenching chamber 14. The combustion chamber 10 is defined by a conventional housing including an upper wall 15, a lower wall 16, sidewalls, a front-end wall having an opening for charging refuse into the combustion chamber (not shown) and a rear-end wall 17. Spaced from the rear-end wall 17 is a partition wall 18 having the upper end thereof spaced from the upper wall 15. A stoker 19 is mounted in the combustion chamber with the upper front end disposed adjacent the charging door and the lower rear end thereof mounted on the upper end of the partition wall 18, so that refuse charged into the incinerator will be deposited on the stoker where it is incinerated. Residue is discharged at the end of the stoker into the passageway 13 and eventually is deposited in the melting chamber 12. As illustrated in the drawing, the upper surface of the lower wall 16 of the incinerator is inclined in the direction of the passageway 13, so that residue falling through the grates of the stoker 19, will slide toward the wall 18 and through an opening 20 in the lower end of the partition wall 18, into the passageway 13.

The passageway 13 is defined by a front-end wall 21 which is vertically aligned with partition wall 18, a rear-end wall 22 which forms a continuation of rear-end wall 17 of the combustion chamber, and a pair of sidewalls. The horizontal cross-sectional area of the passageway 13 is selected according to the design and capacity of the incinerator, so that as residue is discharged from the stoker 19 and through the passageway 13 into the melting chamber 12, it will fill that portion of the melting chamber below the passageway 13 and then accumulate in the passageway, thus sealing the melting chamber from the combustion chamber.

The melting chamber 12 comprises a front-end wall 23, a rear-end wall 24 having a sloped lower section 25 disposed below the passageway 13, a curved upper wall 26 having a curved inner surface 27 for reflecting heat toward the base of the residue deposited in the melting chamber, a bottom wall 28 and a pair of sidewalls. The upper surface of the lower wall 28 is sloped toward the quenching chamber 14 and is provided with a trough 29. The melting chamber also is provided with a pair of burners 30 and 31 mounted in the front and upper walls which are directed toward the base of the residue material deposited in the melting chamber.

A housing having a front-end wall 32, a rear-end wall 33 formed below and as a continuation of front-end wall 23 of the melting chamber, an upper wall 34, a lower wall 35 disposed below the level of the bottom wall 28 of the melting chamber, and a pair of sidewalls define the quenching chamber 14 which is filled with water up to a level below the inlet of a passageway 36 in front-end wall 23 which conducts molten residue overflowing the trough 29 in the melting chamber to the quenching chamber. The upper wall 34 of the quenching chamber is provided with a depending baffle 37 adjacent the outlet of the passageway 36 for directing molten residue from the passageway 36 downwardly through the reservoir of water and onto a conveyor 38 which conveys the quenched residue out of the incinerator.

In operation, refuse including both organic and inorganic materials charged into the incinerator, is deposited on the upper end of the stoker 19 and is ignited by suitable burners provided in the combustion chamber. The stoker consists of a plurality of stationary grates and a plurality of reciprocable grates which reciprocate to stoke the refuse as it burns. The stoking action causes the residue in the combustion chamber 10 to move along the length of the stoker and be discharged from the lower end thereof through the passageway 13 into the melting chamber. Residue falling through the stoker grates is deposited on the lower wall 16 of the combustion chamber and eventually is discharged through the opening 20 in the partition wall 18, into the passageway 13 and the melting chamber 12.

The temperature in the combustion chamber 10 is maintained in the range of 1,800° to 2,000°F. to incinerate almost all of the organic material in the refuse. The products of combustion are discharged through the flue 11. The residue discharged through the passageway 13 into the melting chamber will include inorganic materials and residual unburned organic materials, although the major portion of all organic materials charged into the incinerator will have been burned and reduced to a minimum volume and weight. The residue discharged into the melting chamber 12 and the passageway 13 is allowed to accumulate until the level of such residue rises in the passageway to seal the melting chamber 12 from the combustion chamber 10 before the burners in the melting chamber are actuated.

After the deposit of residue in the passageway 13 rises to a level to cause an effective seal between the combustion chamber and the melting chamber, the burners 30 and 31 are actuated to complete the incineration of the residual organic materials and melt the fusible inorganic materials. The molten residue flows into the trough 29 in the melting chamber and spills over into the passageway 36 into the quenching chamber. At all times during the operation of the melting chamber 12, the incineration process in the combustion chamber continues to discharge residue into the passageway 13 to maintain sufficient residue in the passageway, thus maintaining the seal between the melting chamber and the combustion chamber.

The greater portion of the products of combustion in the melting chamber will pass through a passageway 39 and a breech 40, to be discharged through a flue into the atmosphere. A minor portion of the the products of combustion in the melting chamber, however, will pass through the accumulated residue in the melting chamber and the passageway 13 and will be discharged to the atmosphere either through the flue 11, or a conduit 41, the breech 40 and the flue communicating with the breech 40.

The temperature in the melting chamber is maintained in the range of 2,600° to 2,800°F., which is sufficient to incinerate combustible residual organic materials and to melt most organic materials in the residue. The unburned and molten materials form a slag in the trough 29 and overflow through the passageway 36 into the reservoir of water in the quenching chamber. The slag solidifies as it falls through the water and is deposited in small particles on the conveyor 38 from where it is removed from the incinerator. The particles removed from the incinerator will consist of a minimum of unburned organic materials and inert materials embedded in inorganic materials. Such residue will consist of a minimum volume and weight, and will be substantially free of decomposable and putrescible materials. Such residue further either can be used for landfill purposes, or possibly for other commercial purposes.

The two-step process of the aforementioned embodiment of the invention for reducing refuse to a minimum volume and weight, utilizes a minimum of fuel requirements, in that the greater bulk of combustible inorganic materials are burned in the combustion chamber which is maintained within a lower temperature range than the melting chamber. With most of the combustible organic materials substantially burned, the residue is discharged into the melting chamber which utilizes a higher temperature range to reduce the combustible residual organic materials and melt the inorganic materials to form a slag which is discharged into the quenching chamber.

The construction of the restricted passageway 13 permits the continuous uninterrupted two-step process as described, in that it permits the formation of a seal between the combustion chamber and the melting chamber, thus permitting the two chambers to operate within two different temperature ranges. It will be appreciated that the invention as described avoids the necessity of a single chamber incinerator requiring the maintenance of an operating temperature in the higher range, sufficient not only to incinerate all combustible organic material, but to melt all fusible inorganic material.

Having thus described an embodiment of my invention, I claim:

1. An incinerator adapted to reduce heterogeneous refuse to a minimum volume and weight comprising a combustion chamber, means for charging refuse into said combustion chamber, means for igniting refuse charged into said combustion chamber, said igniting means being sufficient to incinerate combustible organic refuse in said combustion chamber, a melting chamber, passage means for conducting residue from said combustion chamber to said melting chamber, means for melting inorganic residue charged into said melting chamber, said melting means being sufficient to melt inorganic residue received from said combustion chamber, and said passage means being sufficiently restricted in cross-sectional area to cause accumulation of residue in said passage means thereby sealing said melting chamber from said combustion chamber.

2. An incinerator according to claim 1, wherein said melting chamber is disposed at a level below said combustion chamber.

3. An incinerator according to claim 2, wherein said passage means is vertical.

4. An incinerator according to claim 1, wherein said igniting means is sufficient to produce a temperature in the range of 1,800° to 2,000°F. in said combustion chamber and said melting means is sufficient to produce a temperature in the range of 2,600° to 2,800°F. in said melting chamber.

5. An incinerator according to claim 1, including a quenching chamber for receiving molten residue from said melting chamber.

6. An incinerator according to claim 1, including a stoker disposed in said combustion chamber operative to discharge residue into said passage means.

7. A method for reducing refuse to a minimum volume and weight consisting of charging refuse into a combustion chamber, igniting said refuse in said combustion chamber to incinerate burnable organic refuse, conducting the residue from said combustion chamber to a melting chamber, melting said residue in said melting chamber, and permitting residue from said combustion chamber to accumulate between said chambers to seal said melting chamber from said combustion chamber.

8. A method according to claim 7, wherein said combustion chamber is heated to a temperature in the range of 1,800° to 2,000°F. and said melting chamber is heated to a temperature in the range of 2,600° to 2,800°F.

9. A method according to claim 7, including quenching molten residue from said melting chamber.